July 7, 1931.  W. HERDLING  1,812,952

SAND SPRAYING DEVICE FOR MOTOR VEHICLES

Filed April 7, 1930

Patented July 7, 1931

1,812,952

UNITED STATES PATENT OFFICE

WILHELM HERDLING, OF WEHEN, GERMANY

SAND SPRAYING DEVICE FOR MOTOR VEHICLES

Application filed April 7, 1930, Serial No. 442,386, and in Germany February 18, 1930.

In order to render frozen streets passable so called sand sprayers are known, which however are only used in towns and, owing to their limited number, can only be used on the main streets. Sand spraying boxes have also been provided for motor tractors, in order to produce a greater degree of friction by the spraying means in the case of heavy loads and gradients.

The great majority of motor vehicles, passenger- and commercial-cars is however absolutely helpless in winter in the case of frozen streets, especially in the case of sudden frost. The wheels jammed by braking act as sledge runners and a skidding of the vehicle cannot be prevented in curves. The arrangement of sand spraying boxes on these vehicles has hitherto not been possible, owing to the fitting thereof. This objection is overcome, according to the invention.

According to the invention the containers holding the material to be sprayed and automatically delivering same as required, are arranged easily exchangeable on the vehicle, preferably on, inside of, or below the footboard or on the mudguards. Thus it is possible to subsequently fit the apparatus without considerable difficulties on existing vehicles particularly however to equip the vehicles as a rule with the sprayers only during frosty weather, which sprayers can be easily removed if not required.

An embodiment of the invention is illustrated by way of example in the accompanying drawings in which:—

The spraying device consists preferably of an upper square or rectangular box $a$, on the under side of which a discharge funnel $c$, narrowing to a slot opening $b$, is connected. In the slot opening $b$ a rotatable shaft $e$ is inserted, provided with a discharge slot $d$, which regulates the discharge of the material $f$ to be sprayed. A flexible mouthpiece $g$ made of leather or rubber is preferably connected to the slot opening $b$, which mouthpiece extends to a short distance above the ground $h$ and guides the material $f$ positively in front of the wheel in question so that the sand cannot be blown away by a side wind. Dry sand with fine stone chips or the like is preferably used as spraying medium, which can be refilled at service stations.

Figure 1:
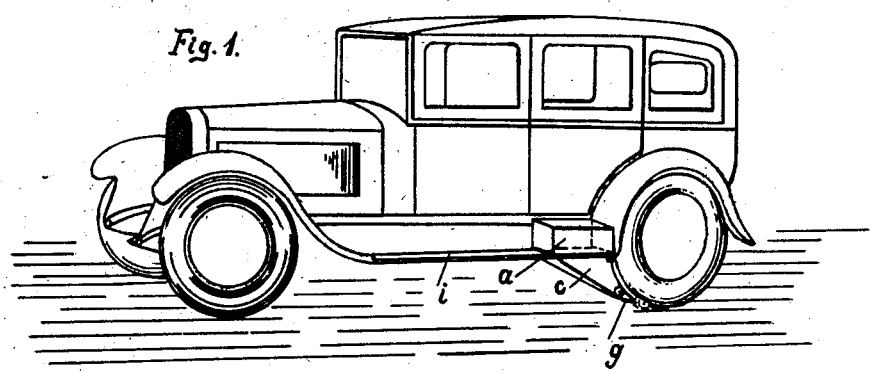
Fig. 1 shows a car in side elevation with a spraying container fitted on the footboard.
Figure 2:
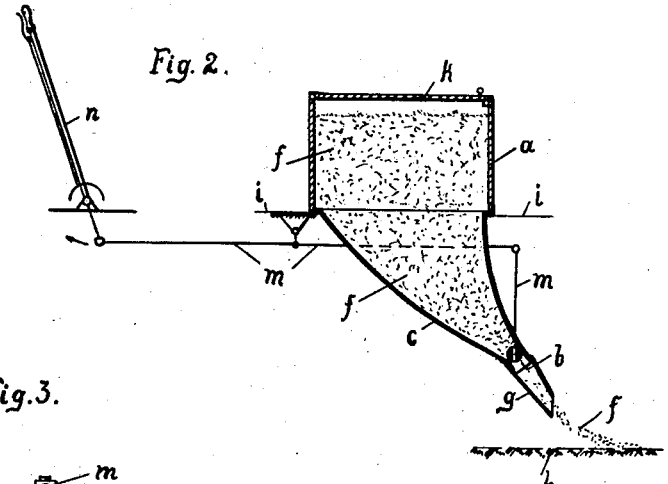
Fig. 2 shows the container with delivery device in longitudinal section on a larger scale.
Figure 3:
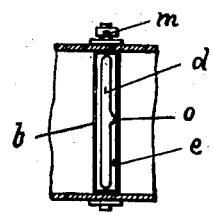
Fig. 3 is a top plan view of the discharge opening of the spraying container, the passage being completely opened for the material to be sprayed.

In the case of private cars with low chassis the spraying container is let into the footboard $i$, as shown in Fig. 1, the hole in the foot-board being closed with a lid after the removal of the sprayer container. The container $a$, $c$, is fitted with a lid $k$ for filling. A rod system $m$ serves for adjusting the shaft $e$, regulating the discharge. This rod system is actuated by an adjustable and settable hand lever $n$. A Bowden wire or other means, controlled from a distance, can also be suitably used. In the event of great danger in the case of very heavily iced places, or when skidding in curves, the entire width of the slot of the discharge opening $d$ is to be freed. In order to save spraying material in the event of long continuous gradients and in order to continually supply the material in a thin spray to the wheel, the shaft $e$ has a semicircular cut out portion $o$, which connects with the slot $d$ and, when suitably set, serves as a separate delivery opening.

A vehicle spraying sand not only protects itself, but also vehicles travelling behind it, the attention of which is drawn to the danger by a sand track. The spraying device is preferably provided in front of the rear wheels on both sides and controlled by a common handle $n$.

I claim:—

1. A sand spraying device for motor vehicles adapted to be operated from the driver's seat, comprising in combination an upper box, a discharge funnel tapering gradually to a slot opening, forming the bottom of said box, and a mouthpiece made of flexible material, such as rubber.

2. A sand spraying device for motor vehicles adapted to be operated from the driver's seat, comprising in combination, an upper box, a discharge funnel tapering gradually to a slot opening, forming the bottom of said box, a mouthpiece made of flexible material, such as rubber, a shaft in said slot opening having a discharge opening, and a cut out portion in said opening adapted to be operated from the driver's seat for large or small discharge.

In testimony whereof I affix my signature.

WILHELM HERDLING.